United States Patent
Qin et al.

(10) Patent No.: US 7,942,288 B2
(45) Date of Patent: May 17, 2011

(54) COOKING UTENSILS WITH METALLIC NON-STICK COATING AND METHODS FOR MAKING THE SAME

(76) Inventors: Raymond Qin, Hong Kong (CN); Wai Tung Ngai, Hong Kong (CN)

( * ) Notice: Subject to any disclaimer, the term of this patent is extended or adjusted under 35 U.S.C. 154(b) by 632 days.

(21) Appl. No.: 11/632,357

(22) PCT Filed: Jul. 14, 2004

(86) PCT No.: PCT/CN2004/000805
§ 371 (c)(1),
(2), (4) Date: Jan. 11, 2007

(87) PCT Pub. No.: WO2006/005232
PCT Pub. Date: Jan. 19, 2006

(65) Prior Publication Data
US 2008/0073357 A1    Mar. 27, 2008

(51) Int. Cl.
*A47J 27/00*    (2006.01)

(52) U.S. Cl. .................. 220/573.2; 219/621; 220/62.13; 220/62.17

(58) Field of Classification Search .................. 219/621; 220/62.13, 62.17, 573.2
See application file for complete search history.

(56) References Cited

U.S. PATENT DOCUMENTS

| | | | |
|---|---|---|---|
| 5,753,313 A | 5/1998 | Tsai | |
| 6,471,791 B1 * | 10/2002 | Nazmy et al. | 148/429 |
| 6,815,099 B1 * | 11/2004 | Zajchowski et al. | 428/698 |
| 7,093,340 B2 * | 8/2006 | Groll | 29/527.4 |
| 2003/0022027 A1 | 1/2003 | Groll | |

FOREIGN PATENT DOCUMENTS

| | | |
|---|---|---|
| CN | 2071480 U | 2/1991 |
| CN | 1498984 A | 5/2004 |
| DE | 3142312 A1 | 5/1983 |
| JP | 05061202 A | 8/1993 |
| JP | 07000289 A | 1/1995 |
| JP | 07023862 A | 1/1995 |

OTHER PUBLICATIONS

Abstract of CN1498984A.
Abstract of CN2071480U.
Office Action/Search Report.
Abstract of DE3142312 (A1).
Supplementary European Search Report for EP 04 73 8403, Nov. 11, 2008.
English Translation of Japanese Patent Application JP 05-061202.
English Translation of Japanese Patent Application JP 07-000289.
English Translation of Japanese Patent Application JP 07-023862.

* cited by examiner

*Primary Examiner* — Anthony Stashick
*Assistant Examiner* — Elizabeth Volz
(74) *Attorney, Agent, or Firm* — Mintz Levin Cohn Ferris Glovsky and Popeo, P.C.

(57) ABSTRACT

Disclosed is a cooking utensil coated with a metallic non-stick coating made of a nickel-aluminum-molybdenum (NiAlMo) alloy mainly composed of nickel aluminum (NiAl), and/or a nickel-chrome-chromic carbide (NiCr—$Cr_3C_2$) alloy mainly composed of chromic carbide ($Cr_3C_2$). A method for coating a cooking utensil with a metallic non-stick coating is also provided. The metallic non-stick coating of the invention possesses high impact, heat and abrasion resistances.

12 Claims, No Drawings

COOKING UTENSILS WITH METALLIC NON-STICK COATING AND METHODS FOR MAKING THE SAME

BACKGROUND OF THE INVENTION

1. Technical Field of the Invention

The present invention relates to a kitchenware, especially to a cooking utensil having a metallic non-stick coating.

2. Description of Prior Art

At present, a majority of non-stick cooking utensils available in market are provided with a non-stick external coating of fluoropolymer resins or similar non-metallic materials, which normally begins to deteriorate after being used for about six months. Therefore, such non-stick cooking utensils always have a short lifespan, which is a consequence of the following properties.

1. Coatings of non-metallic materials like fluoropolymer resins have a low bonding strength with the substrate of cooking utensils. If a coated cooking utensil is impacted with a small external force, the non-metallic coatings could often be damaged. Thus, a conventional non-stick cooking utensil with such coatings is usually equipped with a special accessory, which protects the cooking utensil from the impact of an external force, so as to extend its lifespan.

2. Normally, coatings of non-metallic materials like fluoropolymer resins can only bear a temperature up to about 260° C. However, it is generally required, especially by Chinese people, that a cooking be performed at a temperature higher than 260° C. Thus, the non-metallic coatings fail to be satisfactory in most cases. Moreover, when the cooking is preformed at a temperature over 300° C., the fluoropolymer resins may be decomposed, emitting a fluorine-containing gas harmful to human beings.

3. Coatings of non-metallic materials like fluoropolymer resins have a poor abrasion resistance, and are often significantly damaged after being used for a short period of time. The damage is even more serious if stuff with a hard shell such as testaceans is cooked. For most of Chinese restaurants, the cooking with a wok requires a very high temperature, but the rim portion of the wok often undergoes a "null-heating", in which a portion of the wok is being heated without any cooking stuff on it, and therefore is always kept at a high temperature. However, current fluoropolymer non-stick cooking utensils only have a poor heat resistance. Moreover, the wok is one of the most frequently used cooking utensils in Chinese restaurants, and therefore it is highly required that the wok have a good resistance to impact and abrasion. But current fluoropolymer non-stick cooking utensils have poor performances in these two aspects, and therefore have a short lifespan. As a result, many restaurants still employ conventional iron woks without non-stick coatings, which cause a lot of inconvenience during cooking operation.

Accordingly, it is highly needed to develop a cooking utensil with a metallic non-stick coating, which has excellent impact, heat and abrasion resistances.

SUMMARY OF THE INVENTION

The present invention is to provide a cooking utensil with a metallic non-stick coating having excellent impact, heat, and abrasion resistance overcoming the shortcomings in the prior art.

According to an aspect of the invention, there is provided a cooking utensil having a food contact surface coated with a metallic non-stick coating, of which the material is selected from the group consisting of a nickel-aluminum-molybdenum (NiAlMo) alloy mainly composed of nickel-aluminum (NiAl) and a nickel-chrome-chromic carbide (NiCr—$Cr_3C_2$) alloy mainly composed of chromic carbide ($Cr_3C_2$).

Preferably, a heat contact surface of the cooking utensil, which is in direct contact with heating sources when working, is also coated with the metallic non-stick coating.

Preferably, the metallic non-stick coating on the food contact surface of the cooking utensil comprises a bottom coating of the nickel-aluminum-molybdenum (NiAlMo) alloy mainly composed of nickel-aluminum (NiAl), and a top coating of the nickel-chrome-chromic carbide (NiCr—$Cr_3C_2$) alloy mainly composed of chromic carbide ($Cr_3C_2$).

According to another aspect of the invention, there is provided a method for coating a cooking utensil with a metallic non-stick coating, comprising:

treating a surface to be coated of the cooking utensil by a roughening and cleaning process; and applying, by a hot spray process, a metallic coating material to the treated surface to form the metallic non-stick coating.

According to a preferred embodiment of the invention, the method further comprises treating the metallic non-stick coating so obtained by a polishing process and/or a grinding process.

The metallic non-stick coating of the present invention has many advantages over conventional non-stick coatings. The metallic non-stick coating of the present invention is entirely made of metal or metal alloy, while conventional non-stick coatings are either non-metallic coatings or complex coatings of non-metallic and metallic materials. Since non-metallic materials have a relatively limited temperature tolerance, conventional non-stick coatings made therefrom also have a limited heat resistance. In contrast, the metallic non-stick coating of the invention has no such defects. Moreover, it is apparent for those skilled in the art that metallic coatings have higher impact and abrasion resistances than non-metallic coatings. Hence, no special accessories (e.g. spatula) are needed for cooking utensils with metallic coatings. In addition, metallic coatings formed by hot spray processes bond exceptionally well with the substrate of cooking utensils. Furthermore, the cooking utensil of the invention and the coating thereon are both made of metallic materials, which have a similar coefficient of thermal expansion, and therefore the non-stick metallic coating on the cooking utensil of the invention will not be easily deteriorated even if the cooking utensil is washed with cold water while still being hot. In terms of the coating process, the metallic non-stick coating of the invention can be applied uniformly to a cooking utensil with a high bonding strength by a hot spray process, regardless of the shape and the material of the substrate of the cooking utensil.

DETAILED DESCRIPTION OF THE INVENTION

Hereinafter, the invention will be illustrated more in detail by the following embodiments which show various aspects and advantages of the invention.

In an aspect of the invention, a cooking utensil with a metallic non-stick coating is provided. The metallic non-stick coating may be applied to a working surface (a food contact surface) and/or a heat contact surface (a bottom surface) of the cooking utensil.

The metallic non-stick coating on the cooking utensil of the invention is purely made of metallic materials, such as a nickel-aluminum-molybdenum (NiAlMo) alloy mainly composed of nickel-aluminum (NiAl) and a nickel-chrome-chromic carbide (NiCr—$Cr_3Cr_2$) alloy mainly composed of chromic carbide ($Cr_3Cr_2$). The metallic non-stick coating may be solely made of the nickel-aluminum-molybdenum (NiAlMo) alloy mainly composed of nickel aluminum (NiAl). Alternatively, the metallic non-stick coating may be solely made of the nickel-chrome-chromic carbide (NiCr—$Cr_3Cr_2$) alloy mainly composed of chromic carbide ($Cr_3Cr_2$).

Furthermore, each of the above-mentioned two metallic alloys has many excellent performances. For example, a coating of the nickel-aluminum-molybdenum (NiAlMo) alloy mainly composed of nickel-aluminum (NiAl) has good adhesion and high ductility; and a coating of the nickel-chrome-chromic carbide (NiCr—$Cr_3Cr_2$) alloy mainly composed of chromic carbide ($Cr_3Cr_2$) has good bonding strength (above 8,000 psi), high surface hardness (above HRC 50), and high abrasion and heat resistances (approximately 800° C.).

In a preferred embodiment of the invention, the metallic non-stick coating of the invention comprises a bottom coating of the nickel-aluminum-molybdenum (NiAlMo) alloy mainly composed of nickel-aluminum (NiAl) and a top coating of the nickel-chrome-chromic carbide (NiCr—$Cr_3Cr_2$) alloy mainly composed of chromic carbide ($Cr_3Cr_2$). Such a complex coating possesses the advantages of each alloy, thereby having better properties than coatings of a single alloy. Likewise, the complex coating may also be applied to the heat contact surface of the cooking utensil.

According to a particular embodiment of the present invention, the metallic alloys used can be in a conventional form including, but not limited to, wire, powder and rod.

The metallic non-stick coating of the invention can be formed on a cooking utensil by the following process:

1. A surface to be coated of the cooking utensil is treated by a roughening and cleaning process.

The treatment of the surface to be coated may be accomplished by a conventional method such as a blasting process. More specifically, the blasting process may be performed by impacting the surface with a high speed particle, such as a aluminum oxide sand, a corundum sand and a quartz sand, having a suitable particle size at an elevated pressure to make it rough (surface roughness of Ra 1-6), so as to enable a firm bonding between the surface and the coating.

2. The treated surface is then coated with a metallic material by a hot spray process, in which the metallic material (in wire, powder or rod forms) is converted into high speed particles and applied to the treated surface to form a metallic non-stick coating.

It will be appreciated that the hot spray process used herein can be performed using conventional spraying equipments suitable for high-speed or supersonic plasma spraying, high-speed or supersonic flame spraying (HVAF, HVOF), high-speed or supersonic arc spraying, and detonation spraying.

According to a preferred embodiment of the invention, the particles of the metallic materials are applied to the treated surface at a speed of at least 150 meters per second, i.e. equal to or greater than 150 meters per second, during the hot spray process.

According to another preferred embodiment of the invention, the metallic non-stick coating so obtained is further treated by a polishing process and/or a grinding process. The equipment used for the polishing and the grinding processes may be selected from the group consisting of a stainless steel brush, a sandpaper wheel brush, an abrasive paper, an abrasive circular disc, and a polishing wheel, which may be air-driven or motor-driven.

According to another preferred embodiment of the invention, after being treated by the polishing process and/or the grinding process, a thickness in the range of from 0.01 mm to 0.25 mm is achieved for the metallic non-stick coating.

The major advantages of the metallic non-stick coating of the invention over conventional fluoropolymer coatings are as shown in the following table.

| Particulars | Fluoropolymer Coatings | Metallic Non-Stick Coatings |
| --- | --- | --- |
| Non-stick capability | Excellent | Very Good |
| Oil fumes | Normal | Little |
| Heat conductibility | Normal | Very Good |
| Bonding strength | Normal ($\leq$3,000 psi) | Very good ($\geq$8,000 psi) |
| Chemical resistance | Excellent | Excellent |
| Heat resistance | Quite poor ($\geq$260° C.) | Pretty good ($\leq$800° C.) |
| Abrasion resistance | Poor | Excellent |
| Impact resistance | Poor | Excellent |
| Surface hardness | Low (1-4H) | High ($\geq$HRC50) |
| Special accessories | Required | Not required |
| Thermal shock resistance | Poor (poor resistance to a sudden change of temperature) | Very good |
| Lifespan | Approximately 3 to 9 months | Durable |

It should be understood that although the present invention has been specifically disclosed by preferred embodiments and descriptions, modifications and variations to the present invention, without departing from the spirit of the invention, may be made by one of ordinary skill in the art, and that such modifications and variations will fall within the scope of the invention.

The invention claimed is:

1. A cooking utensil having a food contact surface coated with a metallic non-stick coating, wherein the metallic non-stick coating is made of a material selected from the group consisting of a nickel-aluminum-molybdenum alloy mainly composed of nickel-aluminum, and a nickel-chrome-chromic carbide alloy mainly composed of chromic carbide.

2. The cooking utensil of claim 1, wherein the metallic non-stick coating comprises a bottom coating of the nickel-aluminum-molybdenum alloy mainly composed of nickel-aluminum, and a top coating of the nickel-chrome-chromic carbide alloy mainly composed of chromic carbide.

3. The cooking utensil of claim 1, wherein the non-stick metallic coating has a thickness in the range of 0.01 mm to 0.25 mm.

4. The cooking utensil of claim 1, wherein the cooking utensil further comprises a heat contact surface coated with the metallic non-stick coating.

5. The cooking utensil of claim 4, wherein the metallic non-stick coating comprises a bottom coating of the nickel-aluminum-molybdenum alloy mainly composed of nickel-aluminum, and a top coating of the nickel-chrome-chromic carbide alloy mainly composed of chromic carbide.

6. The cooking utensil of claim 4, wherein the non-stick metallic coating has a thickness in the range of 0.01 mm to 0.25 mm.

7. A method for coating a cooking utensil with a metallic non-stick coating, wherein the metallic non-stick coating is made of a material selected from the group consisting of a nickel-aluminum-molybdenum alloy mainly composed of nickel-aluminum, and a nickel-chrome-chromic carbide alloy mainly composed of chromic carbide, and wherein the method comprising:

treating a surface to be coated of the cooking utensil by a roughening and cleaning process; and applying, by a hot spray process, a metallic coating material to the treated surface to form the metallic non-stick coating.

8. The method of claim 7, further comprising treating the metallic non-stick coating so obtained by a grinding process and/or a polishing process.

9. The method of claim 7, wherein the treatment of the surface to be coated is performed by a blasting process.

10. The method of claim 9, wherein the blasting process is performed by impacting the surface to be coated with a high speed particle selected from the group consisting of a aluminum oxide sand, a corundum sand and a quartz sand having a suitable particle size at an elevated pressure to make it rough.

11. The method of claim 7, wherein the hot spray process is selected from the group consisting of a high-speed or supersonic plasma spraying process, a high-speed or supersonic flame spraying process, a high-speed or supersonic arc spraying process, and a detonation spraying process.

12. The method of claim 11, wherein, in the hot spray process, the metallic coating material is converted into metallic particles and applied to the treated surface at a speed of at least 150 meters per second.

\* \* \* \* \*